UNITED STATES PATENT OFFICE.

CONRAD SCHRAUBE AND EUGEN ROMIG, OF LUDWIGSHAFEN, GERMANY, ASSIGNORS TO THE BADISCHE ANILIN AND SODA FABRIK, OF SAME PLACE.

PHENYLROSINDULIN SULFO-ACID.

SPECIFICATION forming part of Letters Patent No. 524,221, dated August 7, 1894.

Application filed July 29, 1893. Serial No. 481,870. (Specimens.)

*To all whom it may concern:*

Be it known that we, CONRAD SCHRAUBE and EUGEN ROMIG, doctors of philosophy, both subjects of the King of Prussia, residing at Ludwigshafen-on-the-Rhine, in the Kingdom of Bavaria and Empire of Germany, have invented new and useful Improvements in the Manufacture of a New Monosulfo-Acid of a Phenylrosindulin, of which the following is a specification.

In the Letters Patent No. 428,530, granted to Conrad Schraube as sole inventor a mono-sulfo acid of a red basic coloring-matter is described. The said coloring matter was then known as rosindulin but has since received the name of phenyl-rosindulin.

Our present invention relates to the manufacture of a new monosulfo acid of phenyl-rosindulin, isomeric with that described in Schraube's patent hereinbefore mentioned.

Our new monosulfo acid is useful as an initial material for the manufacture of dyes, being converted by sulfonation into a disulfo acid which is a valuable violet-red dye for animal fiber.

The following example will illustrate the manner in which our invention can be carried into effect. The parts are by weight.

*Example. Manufacture of the new phenyl-rosindulin-monosulfo acid.*—Mix together about eleven (11) parts of ortho-amido-di-phenylamin-para-sulfo acid.

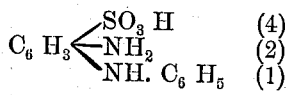

about ten (10) parts of beta-hydroxy-naph-thoquinone-anil, about two hundred parts of alcohol and about one hundred (100) parts of water. Boil the mixture while stirring well. The hydroxy-naphthoquinone-anil disappears as the reaction advances and the new indulin sulfo acid separates out as a heavy crystalline powder. The reaction is complete when a hot weakly alkaline solution of the precipitate is completely reprecipitated by the addition of a slight excess of alkali and the mother liquor is not colored yellowish-red by the presence of unchanged naphtho quinone-anil. When this test is satisfied, collect, press and dry the precipitate.

The new monosulfo acid of phenylrosindulin thus obtained in the form of alkaline salt is isomeric with that which is described in the aforesaid Letters Patent No. 428,530 and possesses the same chemical formula, viz: $C_{28}H_{18}N_3SO_3H$. It differs from it in its chemical constitution in that the sulfo group is attached to the benzene residue of the naphtho-phenazin nucleus and it consequently possesses characteristically different properties. In the form of free acid it is almost insoluble in water, but is readily crystallizable and yields alkaline salts which are soluble in both hot and cold water. On treatment with about four times its weight of ordinary concentrated sulfuric acid (containing about ninety-six per cent. $H_2SO_4$) at a temperature of 100° centigrade it is converted into the above mentioned disulfo acid readily soluble in water which dyes wool in violet-red shades. Its sulfuric acid solution possesses the bright-green color characteristic of phenyl-rosindulin and its sulfo acids.

What we claim as new, and desire to secure by Letters Patent, is—

The new monosulfo acid of phenyl-rosindulin which in the form of free acid is almost insoluble in water but which yields alkaline salts, soluble in both hot and cold water and which can readily be converted into the corresponding disulfo acid by treatment with concentrated sulfuric acid, substantially as hereinbefore described.

In testimony whereof we have hereunto set our hands in the presence of two subscribing witnesses.

CONRAD SCHRAUBE.
EUGEN ROMIG.

Witnesses:
ERNEST F. EHRHARDT,
ADOLPH REUTLINGER.